(12) United States Patent
Hsiao

(10) Patent No.: US 9,551,999 B2
(45) Date of Patent: Jan. 24, 2017

(54) STRUCTURE OF GAS REGULATOR

(71) Applicant: YUNG SHEN GAS APPLIANCE CO., LTD., Chia-Yi (TW)

(72) Inventor: Cheng-Sheng Hsiao, Chia-Yi (TW)

(73) Assignee: Yung Shen Gas Appliance Co., Ltd., Chia-Yi (TW)

( * ) Notice: Subject to any disclaimer, the term of this patent is extended or adjusted under 35 U.S.C. 154(b) by 129 days.

(21) Appl. No.: 14/713,209

(22) Filed: May 15, 2015

(65) Prior Publication Data

US 2016/0334808 A1    Nov. 17, 2016

(51) Int. Cl.
*F16K 37/00*    (2006.01)
*G05D 16/06*    (2006.01)
*F16K 7/12*    (2006.01)

(52) U.S. Cl.
CPC ............... *G05D 16/06* (2013.01); *F16K 7/12* (2013.01); *Y10T 137/8158* (2015.04); *Y10T 137/8225* (2015.04); *Y10T 137/8275* (2015.04); *Y10T 137/8326* (2015.04)

(58) Field of Classification Search
CPC ..... G05D 16/06; F16K 7/12; Y10T 137/8158; Y10T 137/8175; Y10T 137/8225; Y10T 137/8275; Y10T 137/8326; Y10T 137/8359
See application file for complete search history.

(56) References Cited

U.S. PATENT DOCUMENTS

| | | | | |
|---|---|---|---|---|
| 1,187,300 A | * | 6/1916 | Girard .................... | B60S 5/043 137/224 |
| 4,660,600 A | * | 4/1987 | Bergeron ................ | F16K 37/00 137/552 |
| 5,137,051 A | * | 8/1992 | Laur ...................... | G05D 23/275 137/551 |
| 5,605,176 A | * | 2/1997 | Herzberger ........... | F16K 37/0008 116/215 |
| 6,820,647 B1 | * | 11/2004 | Grecco ................... | F16K 31/041 137/137 |
| 2002/0104569 A1 | * | 8/2002 | Massengale ........ | G05D 16/0647 137/553 |
| 2009/0014073 A1 | * | 1/2009 | Huang .................. | G05D 16/0669 137/540 |
| 2011/0048539 A1 | * | 3/2011 | Negre .................... | A61M 27/006 137/1 |
| 2011/0088794 A1 | * | 4/2011 | Cavagna ................ | F23K 5/007 137/557 |

FOREIGN PATENT DOCUMENTS

TW    154178    10/1978

* cited by examiner

*Primary Examiner* — Jessica Cahill
(74) *Attorney, Agent, or Firm* — Rosenberg, Klein & Lee

(57) ABSTRACT

A structure of gas regulator comprises a space for setting an intake switchover valve formed at an outer end of a high-pressure portion and interconnected with the inside of the high-pressure portion. A pushing block is outside a diaphragm, and an elastic element is set between the pushing block and a flange at the periphery of an inner end of the pushing block. A support base outside the pushing block is abutted the elastic element and comprises an extending section extended from an inner end thereof and corresponding to the outer periphery of the elastic element and a through-hole corresponding to the pushing block. A display diaphragm with a center slot is outside the support base. A cover covered the space has a transparent side display window at the periphery thereof and a transparent outer display window at an outer end thereof.

8 Claims, 6 Drawing Sheets

STRUCTURE OF GAS REGULATOR

BACKGROUND OF THE INVENTION

Field of the Invention

The present invention relates a structure of gas regulator. More particularly, the status of gas transportation can be showed by the gas regulator, and the connection of the high-pressure portion and the low-pressure portion is avoided deforming and loosing, achieving that the effects of the gas regulator in all use are promoted.

Description of Related Art

A general gas regulator is disclosed as shown in the Taiwan Patent application with the Issued No. 154178 "AUTOMATIC CHANGEOVER GAS REGULATOR". However, the red display of the automatic changeover gas regulator for showing the exhaustion of gas is set above the regulator body, so the user only can observe from above the regulator body. When the regulator is set, if something covers above the regulator body, the user cannot observe the red display to know the use status of gas, resulting in inconvenience in use.

SUMMARY OF THE INVENTION

Therefore, the object of the present invention is to provide a structure of gas regulator. The setting of the gas regulator is not limited, so it can avoid being hiding, furthermore, the status of gas transportation is clearly showed. In the meanwhile, the connection between the high-pressure portion and the low-pressure portion has better stretching resistance and torsional resistance, which avoids deforming and loosing, achieving that the effects of the gas regulator in all use are promoted.

For the above object, a structure of gas regulator is disclosed, comprising a low-pressure portion, a high-pressure portion, and an intake switchover valve. The low-pressure portion and the high-pressure portion are connected together. A space is formed at an outer end of the high-pressure portion and interconnected with the inside of the high-pressure portion, and the intake switchover valve is set in the space, comprising a diaphragm, a pushing block, an elastic element, a support base, a display diaphragm, and a cover. The pushing block is set outside the diaphragm and a flange is formed at the periphery of an inner end of the pushing block. The elastic element is sleeved the pushing block and between the pushing block and the flange. The support base is set outside the pushing block and abutted an outer end of the elastic element. The support base comprises an extended section extended from an inner end of the support base and corresponding to the outer periphery of the elastic element and a through-hole corresponding to the pushing block. The display diaphragm is set outside the support base and the center of the display diaphragm comprises a slot. The cover is covered the space of the high-pressure portion, wherein a transparent side display window is formed at the periphery of the cover and a transparent outer display window is formed at an outer end of the cover.

DETAILED DESCRIPTION OF THE PREFERRED EMBODIMENT

Figure 1:
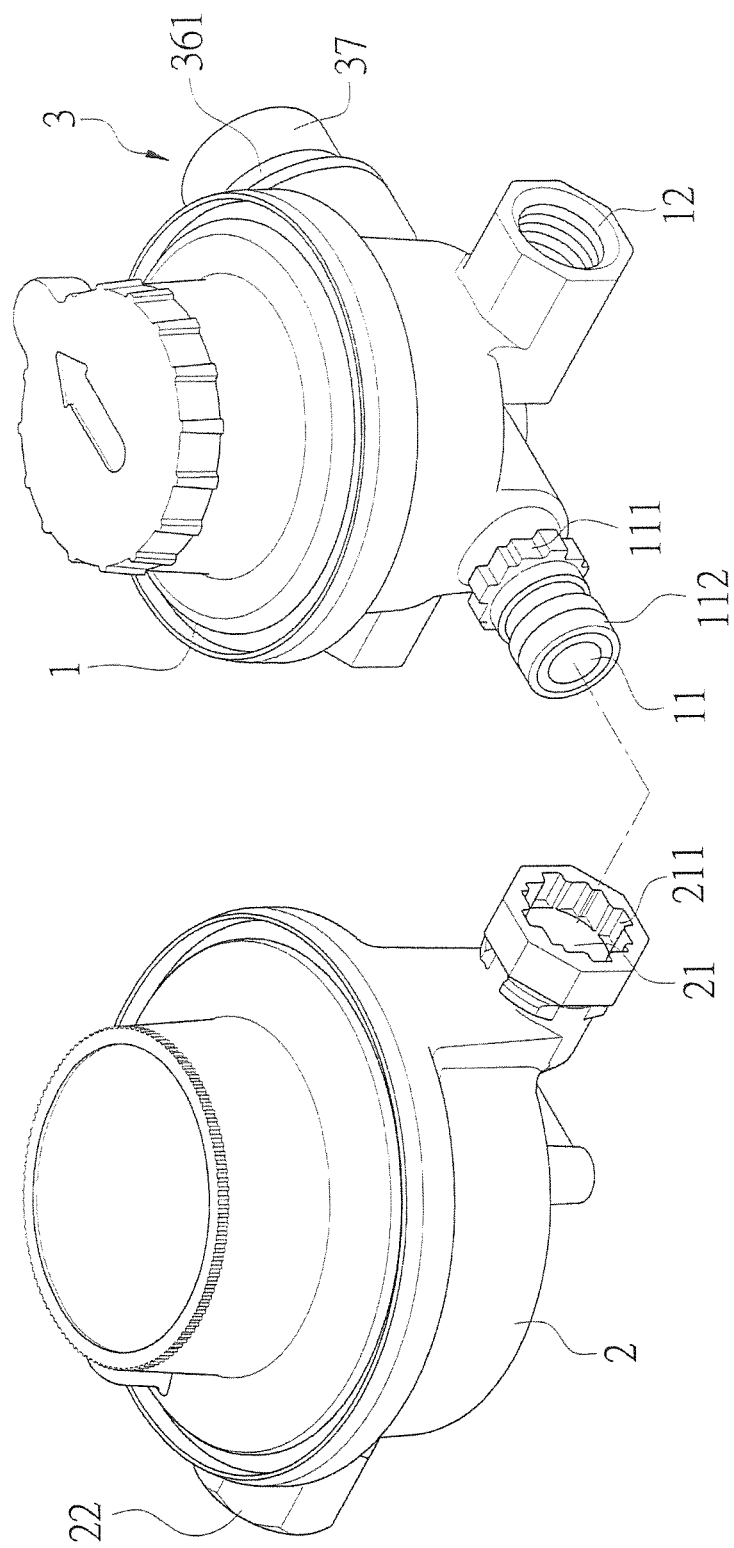
FIG. 1 is an exploded view of a structure of gas regulator according to the embodiment of the present invention.

Please refer to FIG. 1, which is an exploded view of a structure of gas regulator according to the embodiment of the present invention. A gas regulator comprises a high-pressure portion 1 and a low-pressure portion 2. The high-pressure portion 1 is formed with an air outlet 11 corresponding to the low-pressure portion 2 and a gas inlet 12. The outer periphery of the air outlet 11 is formed with several stepped teeth 111, and a sealed pad 112 is sleeved the front end of the air outlet 11. The low-pressure portion 2 is formed with an air inlet 21 corresponding to the air outlet 11 of the high-pressure portion 1 and a gas outlet 22. The inner periphery of the air inlet 21 is formed with a stepped locking slot 211 corresponding to the teeth 111 of the outer periphery of the air outlet 11.

Figure 2:
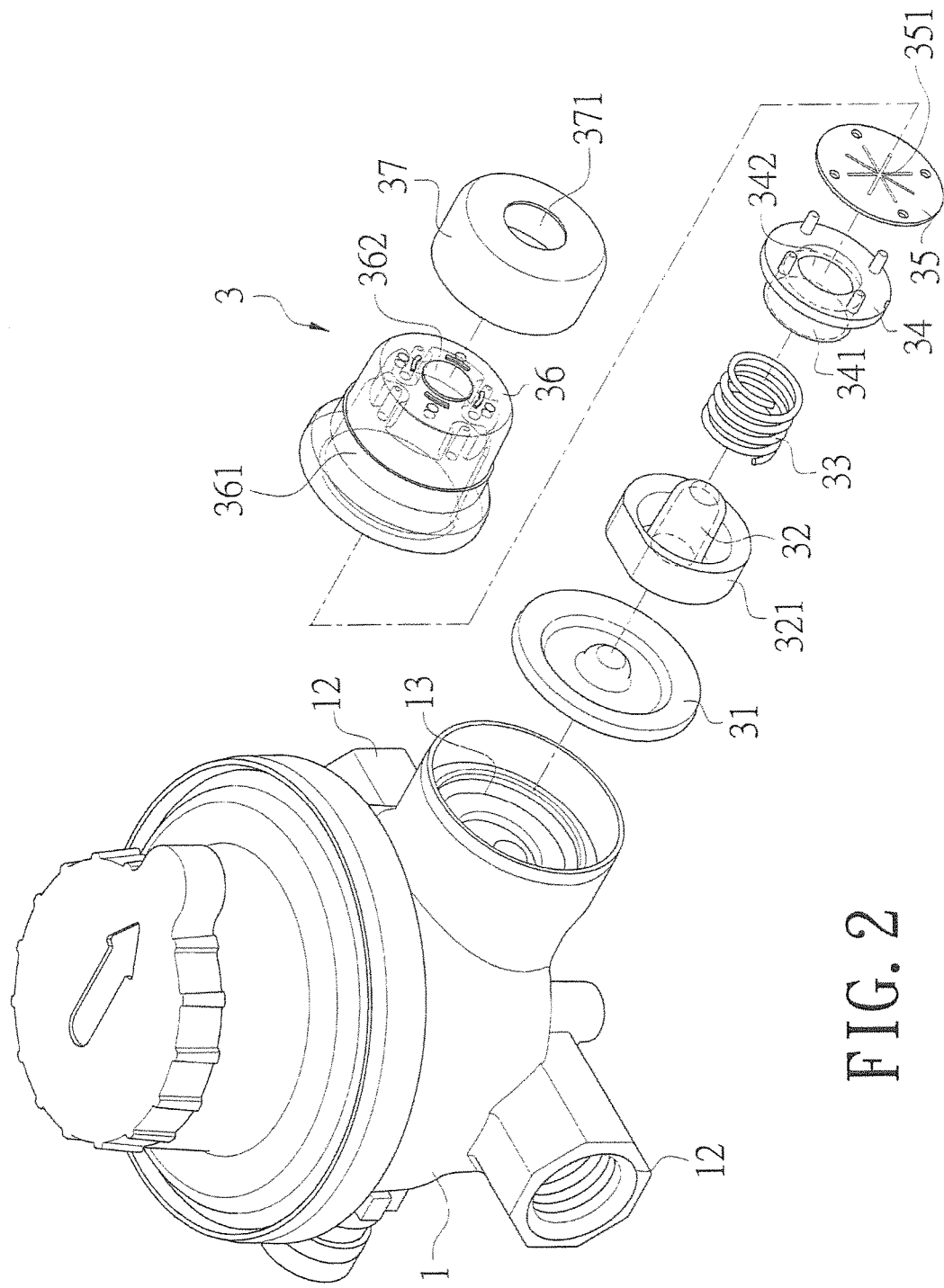
FIG. 2 is an exploded view of an intake switchover valve according to the embodiment of the present invention.

FIG. 2 is an exploded view of an intake switchover valve according to the embodiment of the present invention. An outer end of the high-pressure portion 1 is formed with a space 13 which is interconnected with the inside of the high-pressure portion 1. An intake switchover valve 3 is set in the space 13 and set with a diaphragm 31. A green pushing block 32 is set outside the diaphragm 31, and the periphery of an inner end of the pushing block 32 is formed with a green flange 321. An elastic element 33 is sleeved the pushing block 32 and between the pushing block 32 and the flange 321. A support base 34 is set outside the pushing block 32 and abutted an outer end of the elastic element 33, thereby separating the pushing block 32 from the support base 34 by the elastic element 33 when the gas is not introduced into the high-pressure portion 1. A red extended section 341 is extended from an inner end of the support base 34 and corresponding to the outer periphery of the elastic element 33, so the extended section 341 is covered by the flange 321 when the pushing block 32 and the support base 34 are closed. Moreover, the support base 34 is formed with a through-hole 342 corresponding to the pushing block 32, so the pushing block 32 can be stuck out the through-hole 342. A red display diaphragm 35 is set outside the support base 34 and the center of the display diaphragm 35 is formed with a slot 351 for sticking the pushing block 32 out. A cover 36 is covered the space 13 of the high-pressure portion 1. The periphery of the cover 36 is formed with a transparent side display window 361, and an outer end of the cover 36 is formed with a transparent outer display window 362. A protection cap 37 is set outside the cover 36, and an outer end of the protection cap 37 is formed with an opening 371 corresponding to the outer display window 362 of the cover 36.

Figure 3:
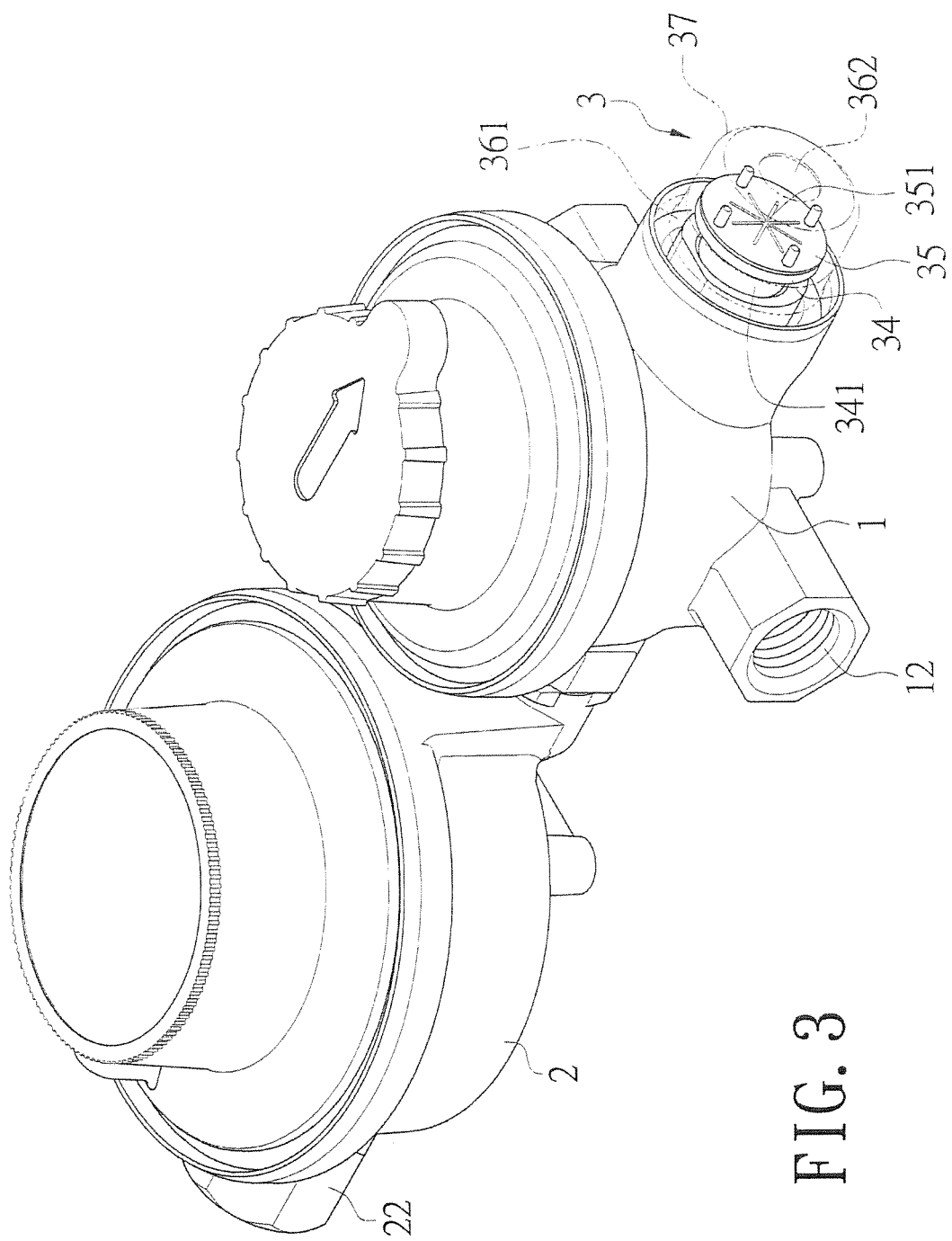
FIG. 3 is a three-dimensional view of a structure of gas regulator according to the embodiment of the present invention.
Figure 4:
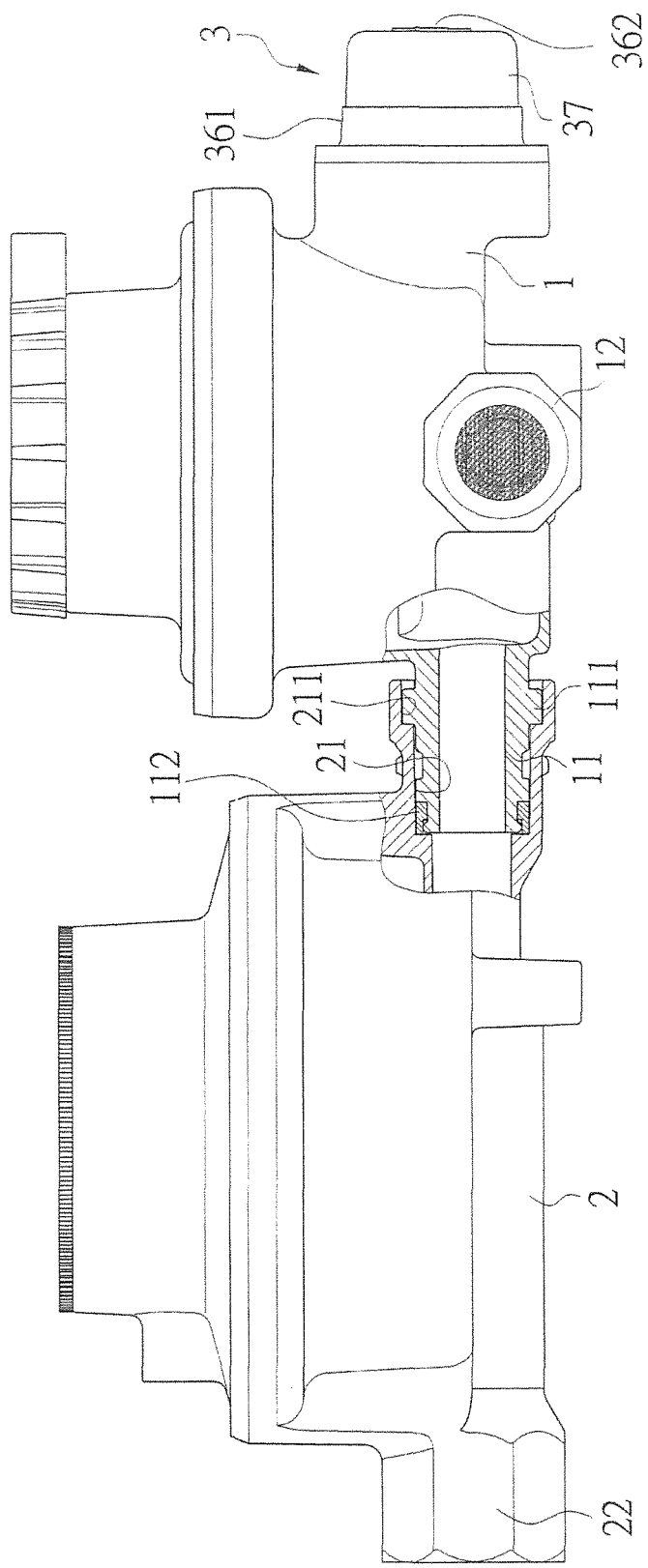
FIG. 4 is a sectional view of the connection between a high-pressure portion and a low-pressure portion according to the embodiment of the present invention.

FIG. 3 is a three-dimensional view of a structure of gas regulator according to the embodiment of the present invention. FIG. 4 is a sectional view of the connection between a high-pressure portion and a low-pressure portion according to the embodiment of the present invention. Please refer to FIG. 3 and FIG. 4. Accordingly, when the foregoing elements of the gas regulator of the present invention are assembled, the air outlet 11 of the high-pressure portion 1 is inserted into the air inlet 21 of the low-pressure portion 2. In detail, the stepped teeth 111 at the outer periphery of the air outlet 11 are engaged with the stepped locking slot 211 at the inner periphery of the air inlet 21. Moreover, the sealed pad 112 sleeved the front end of the air outlet 11 avoids a gas leak. Because of the engagement between the stepped teeth 111 at the air outlet 11 and the stepped locking slot 211 at the air inlet 21, the connection the high-pressure portion 1 and the low-pressure portion 2 is positioned and has better stretching resistance and torsional resistance, avoiding the connection between the high-pressure portion 1 and the low-pressure portion 2 deforming and loosing.

Figure 5:
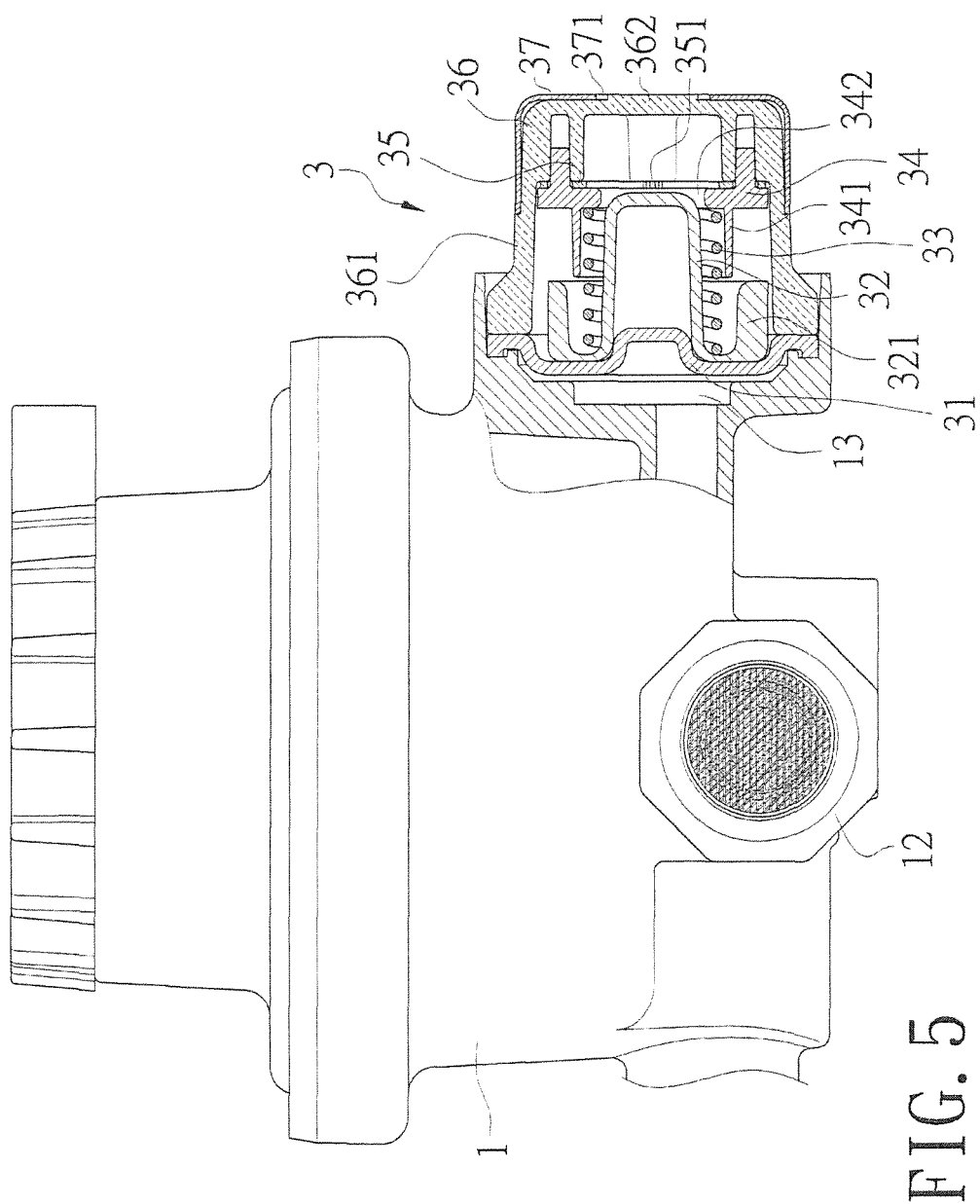
FIG. 5 is a sectional view of an intake switchover valve according to the embodiment of the present invention.

FIG. 5 is a sectional view of an intake switchover valve according to the embodiment of the present invention. When the gas is not introduced into the high-pressure portion 1, because the elastic element 33 pushed the pushing block 32 and the support base 34 of the intake switchover valve 3, the pushing block 32 is separated from the support base 34. Therefore, the user can see the red extended section 341 of the support base 34 from the side display window 361 at the periphery of the cover 36 and the red display diaphragm 35 from the outer display window 362 at the outer end of the cover 36 to know that the gas is not introduced into or is used up.

Figure 6:
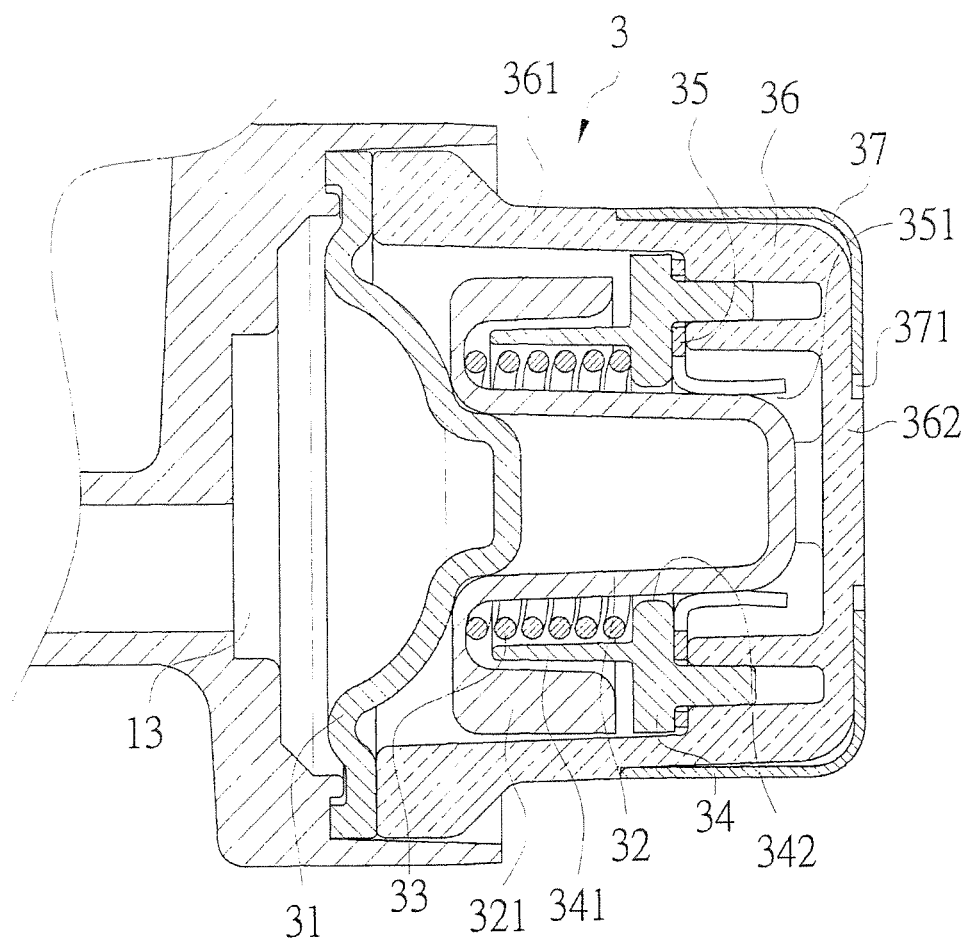
FIG. 6 is a sectional view of an intake switchover valve in use according to the embodiment of the present invention.

FIG. 6 is a sectional view of an intake switchover valve in use according to the embodiment of the present invention. When the gas is introduced into the high-pressure portion 1 from the gas inlet 12, the introduced gas enters the space because of the interconnection of the inside of the high-pressure portion 1 and the space 13, resulting that the diaphragm 31 of the intake switchover valve 3 is pushed outward by the gas. Then, the pushing block 32 is pushed outward by the diaphragm 31 to compress the elastic element 33 toward the support base 34, and in the meantime the flange 321 of the pushing block 32 is moved to cover the outer periphery of the extended section 341 of the support base 34. Therefore, the user can see the green flange 321 of the pushing block 32 from the side display window 361 at the periphery of the cover 36, and in the meantime the front end of the pushing block 32 is stuck out the through-hole 342 of the support base 34 and the slot 351 of the display diaphragm 35, so the user see the green pushing block 32 from the outer display window 362 at the outer end of the cover 36 to know that the gas is enough.

According to the above description and embodiments, the structure of gas regulator of the present invention has the advantages as following:

1. In the intake switchover valve of the present invention, the periphery of the cover is formed with the transparent side display window and the outer end of the cover is formed with the transparent outer display window, so the user observes not only from the side display window clearly at the periphery but also from the outer display window at the outer end of the cover. Therefore, the setting of the gas regulator is not limited, so it avoids the display windows being hiding, furthermore, the status of gas transportation is clearly showed.

2. In the gas regulator of the present invention, the high-pressure portion is connected with the low-pressure portion via the engagement between the stepped teeth at the outer periphery of the air outlet and the stepped locking slot at the inner periphery of the air inlet, so the connection between the high-pressure portion and the low-pressure portion is positioned and has better stretching resistance and torsional resistance, avoiding the connection between the high-pressure portion and the low-pressure portion deforming and loosing,

What is claimed is:

1. A structure of gas regulator, comprising:
    a low-pressure portion;
    a high-pressure portion, connected with the low-pressure portion, wherein a space is formed at an outer end of the high-pressure portion and is interconnected with the inside of the high-pressure portion;
    an intake switchover valve, set in the space of the high-pressure portion, the intake switchover valve comprising:
        a diaphragm;
        a pushing block, set outside the diaphragm, wherein a flange is formed at the periphery of an inner end of the pushing block;
        an elastic element, sleeved the pushing block and between the pushing block and the flange;
        a support base, set outside the pushing block and abutted an outer end of the elastic element, the support base comprising an extended section extended from an inner end of the support base and corresponding to the outer periphery of the elastic element and a through-hole corresponding to the pushing block;
        a display diaphragm, set outside the support base, the center of the display diaphragm comprising a slot; and
        a cover, covering the space of the high-pressure portion, wherein a transparent side display window is formed at the periphery of the cover and a transparent outer display window is formed at an outer end of the cover.

2. The structure of gas regulator according to claim 1, wherein the colors of the pushing block and its flange are green.

3. The structure of gas regulator according to claim 1, wherein the color of the extended section of the support base is red.

4. The structure of gas regulator according to claim 1, wherein the color of the display diaphragm is red.

5. The structure of gas regulator according to claim 1, wherein the transparent side display window is circular.

6. The structure of gas regulator according to claim 1, further comprising a protection cap, set outside the cover, and the protection cap comprising an opening at an outer end of the protection cap and corresponding to the outer display window of the cover.

7. The structure of gas regulator according to claim 1, the high-pressure portion further comprising:
    an air outlet corresponding to the low-pressure portion, and the outer periphery of the air outlet comprising a plurality of teeth; and
    a sealed pad, sleeved the front end of the air outlet; and the low-pressure portion further comprising:
    an air inlet corresponding to the air outlet, the inner periphery of the air inlet comprising a locking slot corresponding to the teeth of the outer periphery of the air outlet.

8. The structure of gas regulator according to claim 7, the teeth of the outer periphery of the air outlet and the locking slot of the inner periphery of the air inlet are in a stepped form.

* * * * *